(12) United States Patent
Oh

(10) Patent No.: US 12,358,529 B2
(45) Date of Patent: Jul. 15, 2025

(54) APPARATUS AND METHOD FOR CONTROLLING A VEHICLE

(71) Applicants: HYUNDAI MOTOR COMPANY, Seoul (KR); KIA CORPORATION, Seoul (KR)

(72) Inventor: Tae Dong Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 104 days.

(21) Appl. No.: 17/842,575

(22) Filed: Jun. 16, 2022

(65) Prior Publication Data
US 2023/0143224 A1 May 11, 2023

(30) Foreign Application Priority Data
Nov. 5, 2021 (KR) .................. 10-2021-0151749

(51) Int. Cl.
*B60W 60/00* (2020.01)
*B60W 30/12* (2020.01)
(Continued)

(52) U.S. Cl.
CPC ........ *B60W 60/0011* (2020.02); *B60W 30/12* (2013.01); *B60W 30/146* (2013.01);
(Continued)

(58) Field of Classification Search
CPC ............ B60W 60/0011; B60W 30/12; B60W 30/146; B60W 30/162; B60W 30/18159; B60W 30/18163; B60W 40/04; B60W 60/0016; B60W 2554/406; B60W 2554/80; B60W 60/00; B60W 2420/42; B60W 2420/52; B60W 2552/05; B60W 2552/10; B60W 2556/50; B60W 2556/55; B60W 2556/65; B60W 30/0956; B60W 30/08; B60W 30/09; B60W 30/095; B60W 30/0953; B60W 40/02; B60W 40/10;
(Continued)

(56) References Cited

U.S. PATENT DOCUMENTS

2019/0135290 A1* 5/2019 Marden ................ G06V 20/588
2019/0163989 A1* 5/2019 Guo ...................... G06F 18/251
(Continued)

OTHER PUBLICATIONS

LaValle, Steven M. "Rapidly-exploring random trees: A new tool for path planning." (1998) (4 pages).
(Continued)

*Primary Examiner* — Grant Moubry
*Assistant Examiner* — Ruben Picon-Feliciano
(74) *Attorney, Agent, or Firm* — Lempia Summerfield Katz LLC

(57) ABSTRACT

An apparatus for controlling a vehicle includes a memory, a network interface, and a processor that determines whether the vehicle is in a bypass situation in which the vehicle has to bypass, calculates a plurality of bypass paths capable of replacing a previously set travel path in the bypass situation, evaluates the plurality of bypass paths, selects one bypass path based on the evaluation of the plurality of bypass paths, and performs control on the vehicle such that the vehicle travels along the selected bypass path.

20 Claims, 15 Drawing Sheets

(51) Int. Cl.
*B60W 30/14* (2006.01)
*B60W 30/16* (2020.01)
*B60W 30/18* (2012.01)
*B60W 40/04* (2006.01)

(52) U.S. Cl.
CPC .... *B60W 30/162* (2013.01); *B60W 30/18159* (2020.02); *B60W 30/18163* (2013.01); *B60W 40/04* (2013.01); *B60W 60/0016* (2020.02); B60W 2554/406 (2020.02); B60W 2554/80 (2020.02)

(58) Field of Classification Search
CPC ............. B60W 50/00; B60W 50/0097; B60W 50/0098; B60W 60/0018; B60W 60/00186; B60W 2552/50; B60W 2554/402; B60W 2554/404; B60W 2554/4041; B60W 60/0015; B60W 60/0027; B60W 2050/0005; B60W 2050/0022; B60W 2050/005; B60W 2050/0057; B60W 2554/4045; B60W 2554/802

See application file for complete search history.

(56) References Cited

U.S. PATENT DOCUMENTS

2020/0066160 A1\* 2/2020 Mishina ................ G08G 1/167
2021/0053570 A1\* 2/2021 Akella ................ G05D 1/0088

OTHER PUBLICATIONS

Ma, Liang, et al. "Efficient sampling-based motion planning for on-road autonomous driving." IEEE Transactions on Intelligent Transportation Systems vol. 16 No.4 (2015): pp. 1961-1976 (16 pages).

\* cited by examiner

APPARATUS AND METHOD FOR CONTROLLING A VEHICLE

CROSS-REFERENCE TO RELATED APPLICATION

This application claims the benefit of and priority to Korean Patent Application No. 10-2021-0151749, filed in the Korean Intellectual Property Office on Nov. 5, 2021, the entire contents of which are incorporated herein by reference.

TECHNICAL FIELD

The present disclosure relates to an apparatus and method for controlling a vehicle, and more particularly, relates to a technology for controlling an autonomous vehicle in real time.

BACKGROUND

The statements in this section merely provide background information related to the present disclosure and may not constitute prior art.

Recently, an autonomous vehicle and a technology for allowing the autonomous vehicle to travel along a path have been developed. To control the autonomous vehicle to travel along a desired path, a vehicle control apparatus may follow the desired path as a travel path.

SUMMARY

In the case where the autonomous vehicle follows a travel path using a conventional method, the autonomous vehicle may fail to track a travel lane when the travel path is blocked by a vehicle parked or stopped on a shoulder, a vehicle trailing at an intersection, or a vehicle stopping across a line while changing a lane. Furthermore, in the case where the autonomous vehicle follows the travel path through the conventional method, it may be difficult to change a lane in a situation in which there is no available lane in the vicinity or to respond to a situation while driving on a lane so as to be biased to one side.

The present disclosure has been made to solve the above-mentioned problems occurring in the prior art while advantages achieved by the prior art are maintained intact.

An aspect of the present disclosure provides a technology for controlling an autonomous vehicle to travel using a bypass path when a travel path of the autonomous vehicle is blocked.

Another aspect of the present disclosure provides a technology for setting a plurality of bypass paths and selecting one of the plurality of bypass paths in real time.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, an apparatus for controlling a vehicle includes: a memory, a network interface, and a processor. The processor determines whether the vehicle is in a bypass situation in which the vehicle has to bypass, calculates a plurality of bypass paths capable of replacing a previously set travel path in the bypass situation, evaluates the plurality of bypass paths, selects one bypass path, based on an evaluation result of the plurality of bypass paths, and performs control on the vehicle such that the vehicle travels while following the selected one bypass path.

In an embodiment, the processor may determine whether the vehicle is in the bypass situation, based on a traffic flow impediment target and ambient information included in integrated object information.

In an embodiment, the processor may determine whether the vehicle is in the bypass situation, based on a presence of a target impeding a traffic flow on the travel path of the vehicle and a possibility to respond to the target by deflection on a line or a lane change.

In an embodiment, the processor may determine, as the bypass situation, a situation where the travel path is blocked by another vehicle parked or stopped on a shoulder, another vehicle trailing at an intersection, or another vehicle stopping across a line while making a lane change.

In an embodiment, when a traffic flow impediment target exists, the processor may determine whether to perform waiting and speed reduction for the target or whether to calculate the plurality of bypass paths and travel along an alternative path.

In an embodiment, when it is impossible to respond to the bypass situation by deflection of the vehicle on a line or a lane change of the vehicle in the bypass situation, the processor may calculate a loss function through waiting time for existing path tracking and sampling, and when an output value of the loss function is greater than a threshold value, the vehicle may follow an alternative path.

In an embodiment, the processor may calculate expected waiting time for calculating the loss function. When an existing path is followed or at an intersection, the expected waiting time may be a time period to the next signal, and wherein when a traffic flow impediment target exists, the expected waiting time may be an expected time period until the traffic flow impediment target travels again.

In an embodiment, when a preference criterion for selecting the one bypass path among the plurality of bypass paths is set to include safety of the vehicle during travel, the processor may select, among the plurality of bypass paths, bypass paths along which a distance between the vehicle and another vehicle is greater than or equal to a threshold value, and determine a final bypass path, among the selected bypass paths, along which the sum of distances between the vehicle and the another vehicle is maximum.

In an embodiment, the processor may calculate an expected path of another vehicle and an expected path of the vehicle for each time, may calculate an expected relative distance between the vehicle and another vehicle for each time, and may exclude a corresponding path from candidate bypass paths when the expected relative distance is shorter than a minimum threshold value at arbitrary time.

In an embodiment, the processor may generate a first bypass path and set the first bypass path as a new reference path when a reference path of the vehicle is impeded by another vehicle and may generate a modified bypass path when the vehicle is impeded by another vehicle while travelling along the new reference path corresponding to the first bypass path.

In an embodiment, the processor may collect a plurality of traces of a plurality preceding vehicles travelling ahead of the vehicle and may calculate the plurality of bypass paths by tracking the plurality of preceding vehicles during a plurality of frames and determining whether the plurality of preceding vehicles consistently precede the vehicle.

In an embodiment, the processor may calculate a risk based loss value, a detour distance based loss value, and a preceding vehicle trace based loss value while generating a loss function, may convert a loss value into a score by using the loss function, and may determine a final bypass path based on a risk score, a detour distance score, and a preceding vehicle trace score calculated while the loss function is generated.

In an embodiment, the processor may assign weighting values to the risk score, the detour distance score, and the preceding vehicle trace score of each of the plurality of bypass paths, may calculate a weighted average score of each of the plurality of bypass paths by using the scores to which the weighting values are assigned, may compare the weighted average scores of the plurality of bypass paths, and may select a path having the highest weighted average score as the final bypass path.

In an embodiment, the processor may compare a loss value of an alternative path and a loss value of a newly generated alternative path in the evaluation and may modify the bypass path to the newly generated alternative path when the loss value of the existing alternative path is greater than the loss value of the newly generated alternative path.

In an embodiment, the processor may determine whether to end a bypass section, depending on whether the vehicle deviates from a lane link set and a road link section belonging to a start point and an end point of the bypass path and whether the vehicle follows an existing global path.

According to another aspect of the present disclosure, a method for controlling a vehicle includes determining whether the vehicle is in a bypass situation in which the vehicle has to bypass, calculating a plurality of bypass paths capable of replacing a previously set travel path in the bypass situation, evaluating the plurality of bypass paths, selecting one bypass path, based on an evaluation result of the plurality of bypass paths, and controlling the vehicle to travel along the selected one bypass path.

BRIEF DESCRIPTION OF THE DRAWINGS

The above and other objects, features and advantages of the present disclosure should be more apparent from the following detailed description taken in conjunction with the accompanying drawings.

Figure 1A:
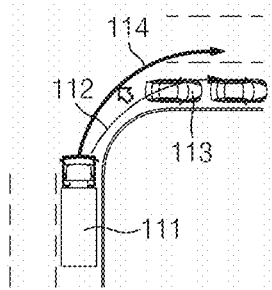
FIGS. 1A, 1B and 1C are views illustrating various situations to which a vehicle control method according to an embodiment of the present disclosure is applied.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions is ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1 to 14.

Figure 1B:
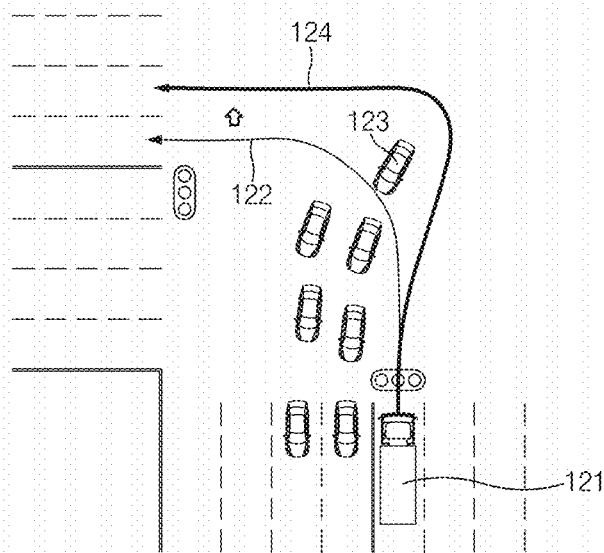
Figure 1C:
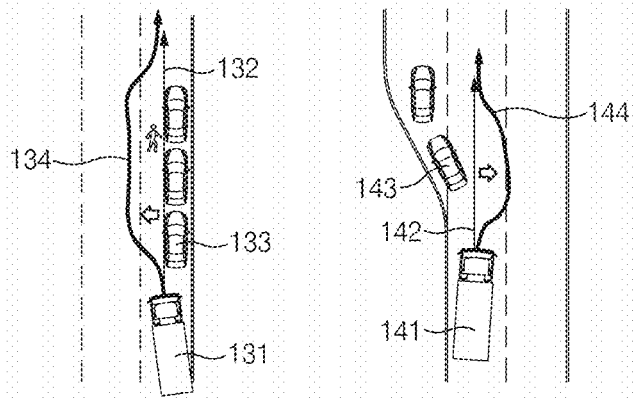

FIGS. 1A, 1B, 1C are views illustrating various situations to which a vehicle control method according to an embodiment of the present disclosure is applied.

Referring to FIG. 1A, a vehicle control apparatus may be configured such that a vehicle 111 travels along a travel path 112 and makes a right turn so as to be adjacent to the shoulder of a road while following the travel path 112. When there is another vehicle 113 parked or stopped on the shoulder adjacent to the travel path 112, the vehicle control apparatus may control the vehicle 111 such that the vehicle 111 travels along a bypass path 114 that bypasses the other vehicle 113.

Referring to FIG. 1B, the vehicle control apparatus may be configured such that a vehicle 121 travels along a travel path 122 and makes a left turn at an intersection while following the travel path 122. When there is another vehicle 123 that is trailing at the intersection on the travel path 122 and thus obstructs the passage of the vehicle 121 along the travel path 122, the vehicle control apparatus may control the vehicle 121 such that the vehicle 121 travels along a bypass path 124 that bypasses the other vehicle 123.

Referring to FIG. 1C, the vehicle control apparatus may be configured such that a vehicle 131 travels while following a travel path 132 passing through the last lane adjacent to the shoulder of a road. When there is another vehicle 133 parked or stopped on the shoulder adjacent to the travel path 132, the vehicle control apparatus may control the vehicle 131 such that the vehicle 131 travels along a bypass path 134 that bypasses the other vehicle 133.

The vehicle control apparatus may be configured such that a vehicle 141 travels while following a travel path 142 along which the vehicle 141 travels straight ahead on a specified lane. When there is another vehicle 143 that stops across a line while making a lane change in front of the travel path 142, the vehicle control apparatus may control the vehicle 141 such that the vehicle 141 travels along a bypass path 144 that bypasses the other vehicle 143.

The vehicle control apparatus according to an embodiment of the present disclosure may control a vehicle such that the vehicle travels along a bypass path, by determining an optimum bypass path among a plurality of bypass paths based on a risk level in a drivable area around a travel path, a detour distance of a bypass path, and a preceding vehicle path and calculating a travel strategy through a selection of intersection of another vehicle on the bypass path, cut-in of another vehicle, in-pass of another vehicle, or another vehicle that is deflected.

Figure 2:
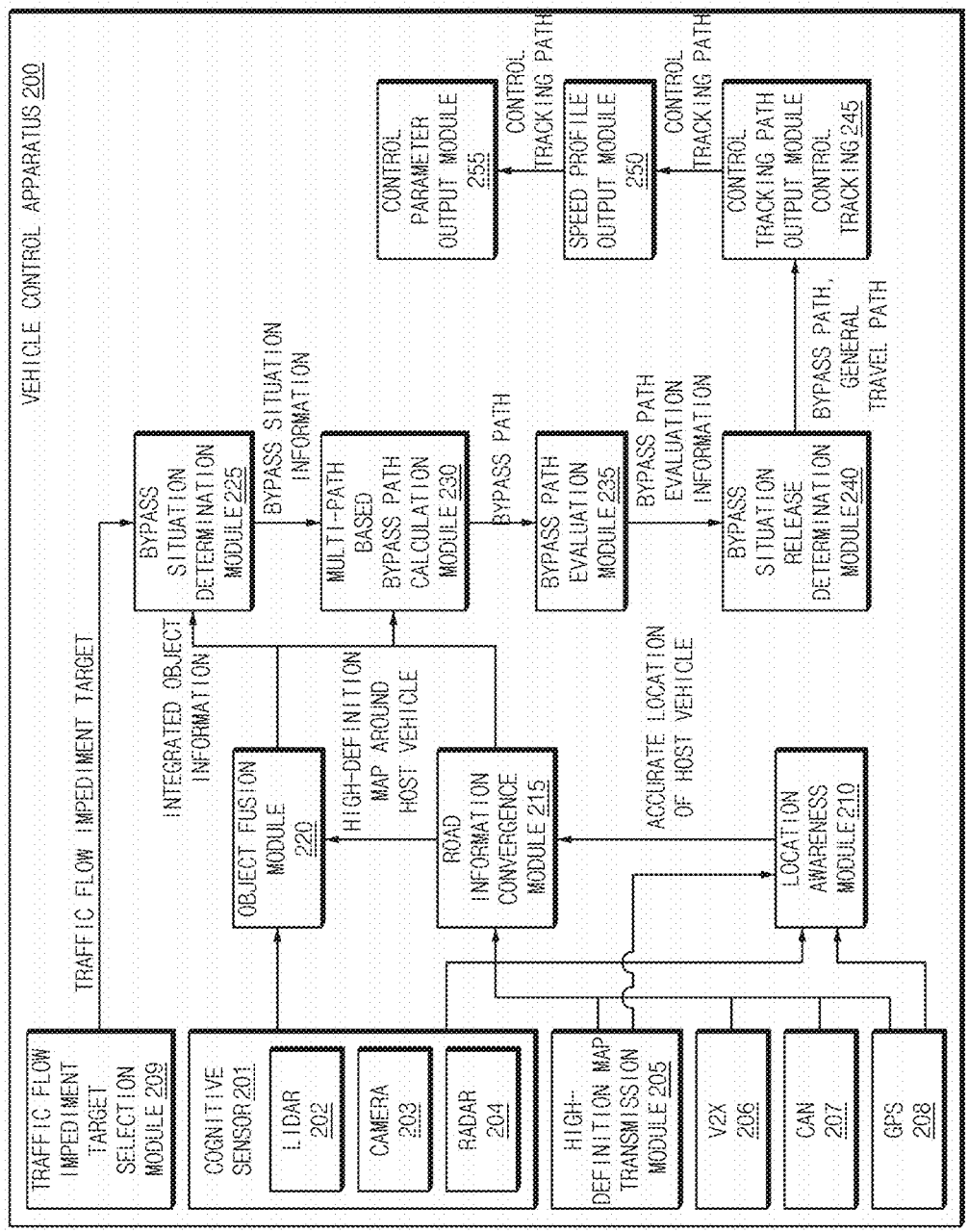
FIG. 2 is a view illustrating a vehicle control apparatus according to an embodiment of the present disclosure.

FIG. 2 is a view illustrating a vehicle control apparatus according to an embodiment of the present disclosure.

The vehicle control apparatus 200 may establish a bypass path of a vehicle on a general road including a straight path and various curved paths and may control the vehicle to respond to intersection, cut-in, in-pass, and deflection of another vehicle. The vehicle control apparatus 200 may include a cognitive sensor 201, a high-definition map transmission module 205, V2X 206, a CAN 207, a GPS 208, a traffic flow impediment target selection module 209, a location awareness module 210, a road information convergence module 215, an object fusion module 220, a bypass situation determination module 225, a multi-path based bypass path calculation module 230, a bypass path evaluation module 235, a bypass situation release determination module 240, a control tracking path output module 245, a speed profile output module 250, and a control parameter output module 255.

The cognitive sensor 201 may include a LIDAR 202, a camera 203, and a radar 204. Cognitive information through the LIDAR 202, the camera 203, and the radar 204 may provide reliable information for each object through the object fusion module 220.

The high-definition map transmission module 205 may generate a high-definition map for an area around the vehicle. The V2X 206 may transmit and receive information required for autonomous driving with another vehicle through vehicle to everything communication. The vehicle control apparatus may perform communication with other devices in the vehicle through the CAN 207. The GPS 208 may generate location information of the vehicle. The traffic flow impediment target selection module 209 may sense an object that blocks a travel path of the vehicle. The traffic flow impediment target selection module 209 may transfer a traffic flow impediment target to the bypass situation determination module 225.

The location awareness module 210 may receive cognitive information from the cognitive sensor 201. The location awareness module 210 may receive location information of the vehicle from the GPS 208. The location awareness module 210 may receive high-definition map information from the high-definition map transmission module 205. The location awareness module 210 may compare the cognitive information, the location information of the vehicle, and the high-definition map information and may output the location information of the vehicle and location awareness reliability information. The location awareness module 210 may transfer, to the road information convergence module 215, the accurate location of the host vehicle that is a vehicle controlled by the vehicle control apparatus itself.

The road information convergence module 215 may use the cognitive information and the high-definition map information to generate high-definition map information around the vehicle. The road information convergence module 215 may output, to the object fusion module 220, an accurate map around the host vehicle.

The object fusion module 220 may output an object on the accurate map through the cognitive information and the high-definition map information around the host vehicle. The object fusion module 220 may transfer integrated object information to the bypass situation determination module 225.

The bypass situation determination module 225 may determine whether the vehicle is in a bypass situation in which the vehicle has to bypass. The bypass situation determination module 225 may determine whether the vehicle is in the bypass situation, by using the traffic flow impediment target and ambient information included in the integrated object information. The bypass situation determination module 225 may transfer bypass situation information to the multi-path based bypass path calculation module 230.

The multi-path based bypass path calculation module 230 may calculate a plurality of bypass paths capable of replacing the previously set travel path in the bypass situation. The multi-path based bypass path calculation module 230 may transfer the plurality of bypass paths to the bypass path evaluation module 235.

The bypass path evaluation module 235 may evaluate the plurality of bypass paths. The bypass path evaluation module 235 may evaluate the plurality of bypass paths using risk levels of the plurality of bypass paths, detour distances of the plurality of bypass paths, and paths of a preceding vehicle. The bypass path evaluation module 235 may transfer bypass path evaluation information to the bypass situation release determination module 240.

The bypass situation release determination module 240 may determine whether the area where the vehicle travels at present is within a bypass section. The bypass situation release determination module 240 may switch to a general travel path in response to determination that the bypass situation is released. The bypass situation release determination module 240 may transfer the bypass path or the general travel path to the control tracking path output module 245.

The control tracking path output module 245 may calculate a control tracking path of the vehicle based on the bypass path in the bypass situation. When the bypass situation is released, the control tracking path output module 245 may calculate the control tracking path of the vehicle, based on the general travel path. The control tracking path output module 245 may transfer the control tracking path to the speed profile output module 250.

The speed profile output module 250 may output a speed profile of the vehicle through information such as the curvature of the control tracking path, the gradient of the control tracking path, the speed limit of the control tracking path, and a preceding vehicle on the control tracking path. The speed profile output module 250 may transfer the speed profile and the control tracking path to the control parameter output module 255.

The control parameter output module 255 may calculate a controller input parameter, based on the speed profile and the control tracking path. The vehicle control apparatus 200 may control the vehicle to travel along a path set by calculating the controller input parameter.

Figure 3:
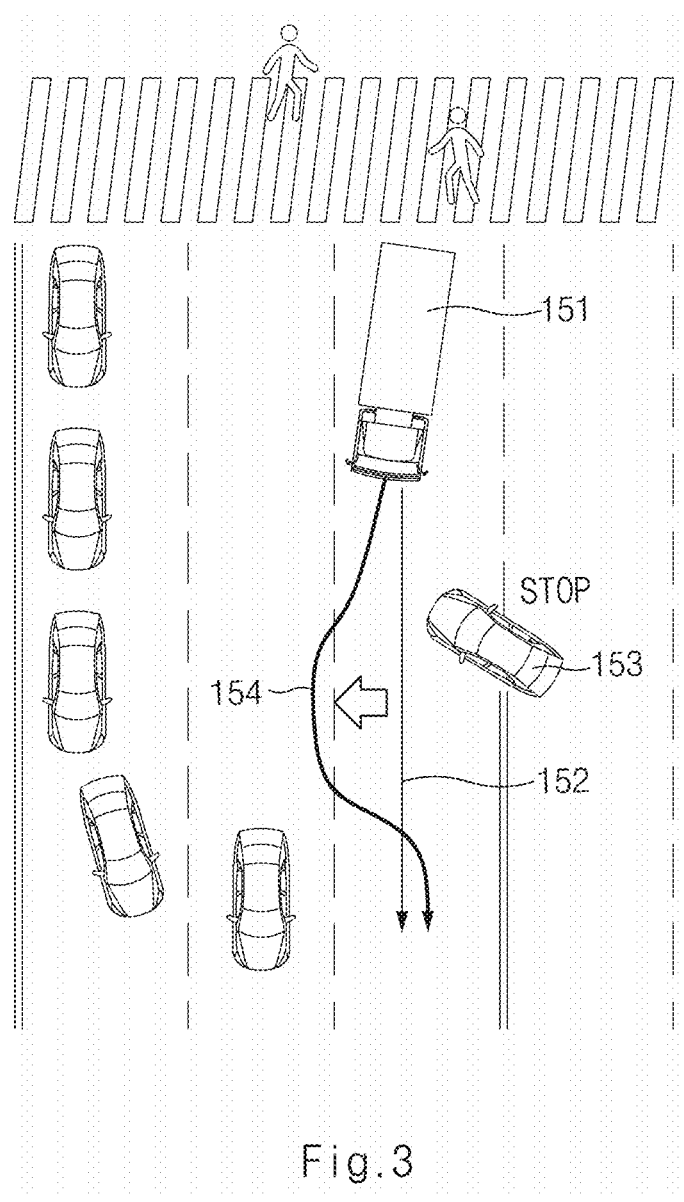
FIG. 3 is a view illustrating a situation in which a bypass path is required during travel of a vehicle according to an embodiment of the present disclosure.

FIG. 3 is a view illustrating a situation in which a bypass path is required during travel of a vehicle according to an embodiment of the present disclosure.

The vehicle control apparatus may control a vehicle 151 such that the vehicle 151 travels along a specified travel path 152. Various situations may occur during autonomous driving of the vehicle 151. For example, another vehicle 153 may be located in front of the travel path 152. In another example, when the vehicle 151 crosses a railroad, a stop signal at the crossroads, an intersection with signals, a T-shaped intersection, a merge section, a highway, or a driving situation in a low-visibility environment may occur. In another example, a long-distance driving situation may occur due to changes in various driving environments. When the various situations occur, the vehicle control apparatus may determine whether a bypass path 154 is required. When the bypass path 154 is required, the vehicle control apparatus may control the vehicle 151 such that the vehicle 151 travels along the bypass path 154.

Hereinafter, it is assumed that the vehicle control apparatus performs the processes of FIGS. 4 to 6, 11, 13, and 14. Furthermore, in the descriptions of FIGS. 4 to 6, 11, 13, and 14, operations described as being performed by the vehicle control apparatus may be understood as being controlled by a processor of the vehicle control apparatus (e.g., a processor 1100 of FIG. 15).

Figure 4:
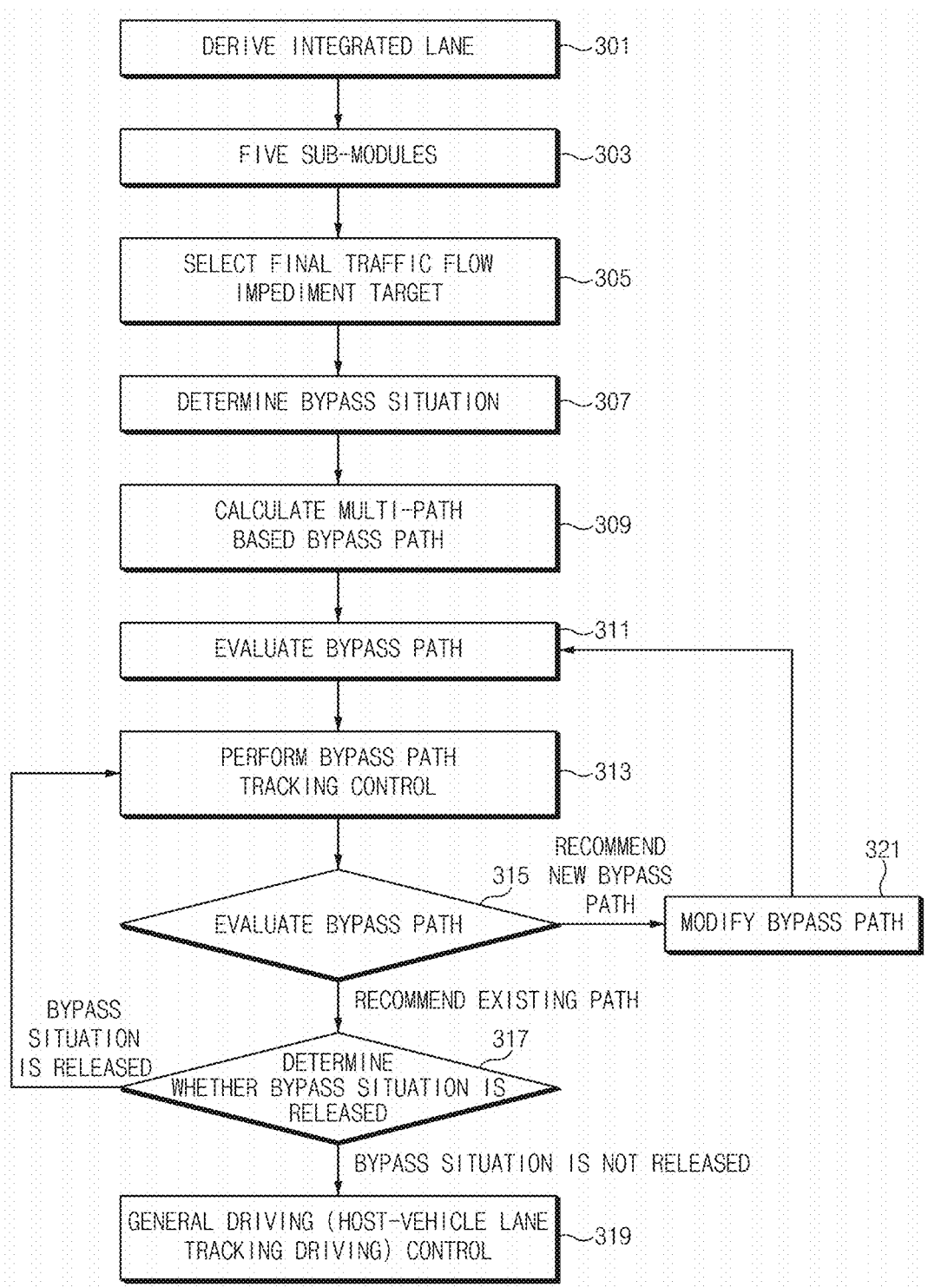
FIG. 4 is a flowchart illustrating a method of controlling a vehicle such that the vehicle travels along a bypass path according to an embodiment of the present disclosure.

FIG. 4 is a flowchart illustrating a method of controlling a vehicle such that the vehicle travels along a bypass path according to an embodiment of the present disclosure.

In operation 301, the vehicle control apparatus may derive an integrated lane. In operation 301, the vehicle control apparatus may select a travel lane for which a travel path is to be set. In operation 303, the vehicle control apparatus may use five sub-modules. The five sub-modules may include the LIDAR 202, the camera 203, the radar 204, the high-definition map transmission module 205, and the GPS 208. In operation 303, the vehicle control apparatus may recognize surroundings using the five sub-modules. In operation 305, the vehicle control apparatus may select a final traffic flow impediment target. In operation 305, the vehicle control apparatus may receive final traffic flow impediment target select information from an interest target determination system for real-time bypass path driving of an autonomous vehicle.

In operation 307, the vehicle control apparatus may determine whether the vehicle is in a bypass situation in which the vehicle has to bypass. In operation 307, the vehicle control apparatus may determine whether the vehicle is in the bypass situation in which the vehicle has to bypass, based on a presence of a target impeding a traffic flow on the travel path of the vehicle and a possibility to respond to the target by deflection on a line or a lane change.

In operation 309, the vehicle control apparatus may calculate a multi-path based bypass path. In operation 309, the vehicle control apparatus may calculate a plurality of bypass paths capable of replacing the previously set travel path in the bypass situation. In operation 309, the vehicle control apparatus may determine that the vehicle is in the bypass situation and may calculate a plurality of travel paths along which the vehicle is able to bypass in the bypass situation.

In operation 311, the vehicle control apparatus may evaluate the plurality of bypass paths. In operation 311, the vehicle control apparatus may analyze risk levels of the plurality of bypass paths, detour distances of the plurality of bypass paths, and a path of a preceding vehicle. Based on the analysis result, the vehicle control apparatus may select one of the plurality of bypass paths as an optimum path along which the vehicle bypasses.

In operation 313, the vehicle control apparatus may perform bypass path tracking control. In operation 313, the vehicle control apparatus may select one bypass path based on the evaluation of the plurality of bypass paths. In operation 313, the vehicle control apparatus may perform control on the vehicle such that the vehicle travels while following the selected one bypass path.

In operation 315, the vehicle control apparatus may evaluate a bypass path. The vehicle control apparatus may consistently perform bypass path evaluation on the control path along which the vehicle travels at present. When the bypass path evaluation result recommends the existing path, the vehicle control apparatus may proceed to operation 317. When the bypass path evaluation result recommends a new bypass path, the vehicle control apparatus may proceed to operation 321.

In operation 317, the vehicle control apparatus may determine whether the bypass situation is released. In operation 317, the vehicle control apparatus may track whether the current bypass situation is released. When the tracking result shows that the bypass situation is released, the vehicle control apparatus may proceed to operation 319. When the tracking result shows that the bypass situation is not released, the vehicle control apparatus may proceed to operation 313.

In operation 319, the vehicle control apparatus may control the vehicle in general driving. The general driving may include host-vehicle lane tracking driving. When the bypass situation is released, the vehicle control apparatus may switch to the general driving and may control the vehicle.

In operation 321, the vehicle control apparatus may modify the bypass path. When the bypass path evaluation result is a new path, the vehicle control apparatus may change the current control path to the new bypass path. After modifying the bypass path to the new bypass path in operation 321, the vehicle control apparatus may return to operation 311 to perform bypass path evaluation on the new bypass path.

Figure 5:
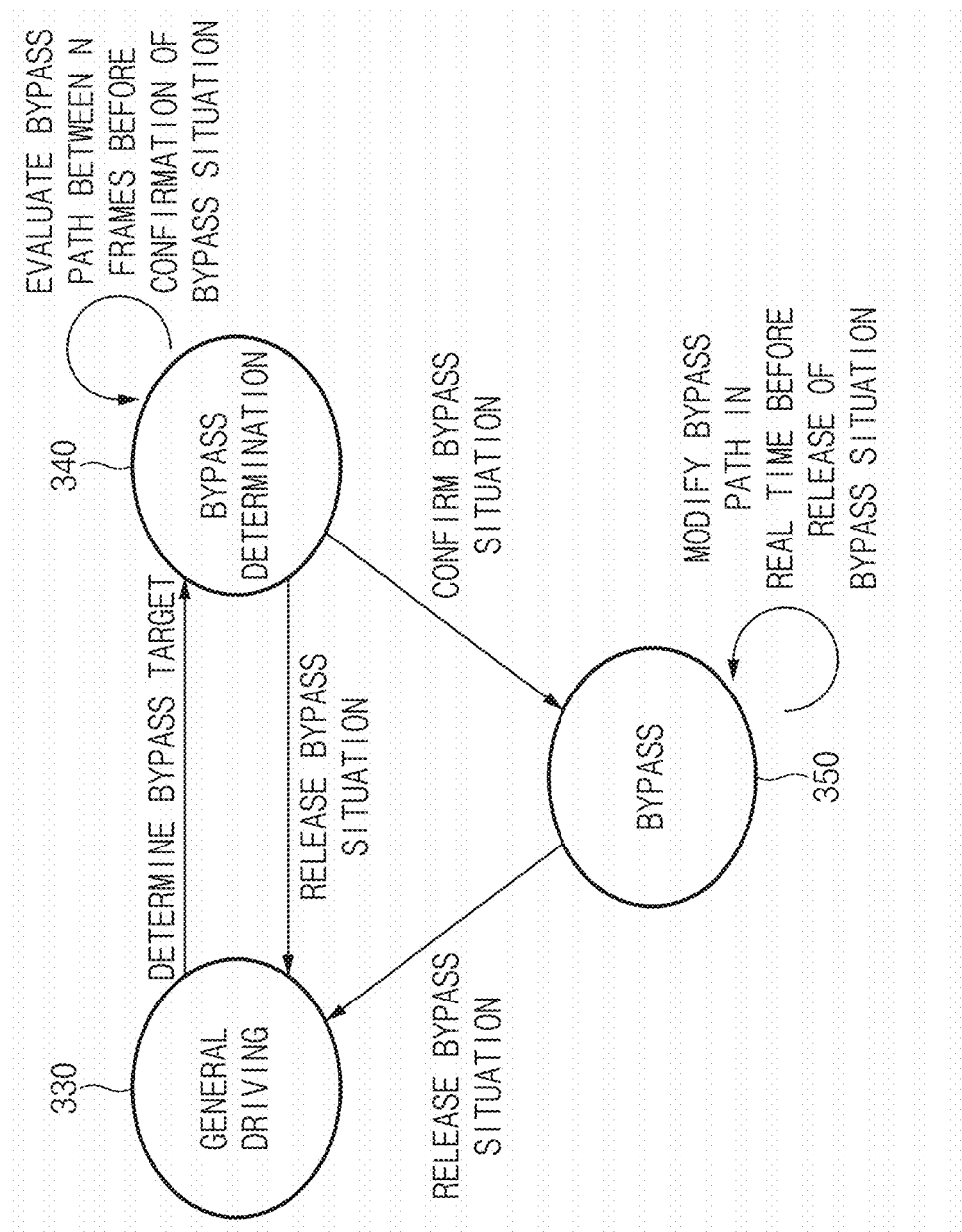
FIG. 5 is a view illustrating a finite state machine (FSM) illustrating a driving state of following a bypass path according to an embodiment of the present disclosure.

FIG. 5 is a view illustrating a finite state machine (FSM) illustrating a driving state of following a bypass path according to an embodiment of the present disclosure.

A driving state of following a bypass path may include a general driving state 330, a bypass determination state 340, and a bypass state 350. The general driving state 330 may define a general driving state before bypass driving.

When a bypass target exists on a vehicle travel path, a transition from the general driving state 330 to the bypass determination state 340 may be made. In the bypass determination state 340, whether the front bypass target is a target that a vehicle unilaterally has to avoid and whether it is impossible to respond to the target due to a lane change or deflection of the vehicle on a line may be observed together with bypass path evaluation during specified N frames.

When it is determined that the vehicle has to bypass, a bypass situation may be confirmed, and a transition from the bypass determination state 340 to the bypass state 350 may be made. When it is determined that the vehicle does not have to bypass, a transition from the bypass determination state 340 to the general driving state 330 may be made.

In the bypass state 350, bypass path control tracking may be performed. In the bypass state 350, the current bypass path may be consistently evaluated and modified and may be observed until the bypass situation is released.

In the bypass state 350, whether to release the bypass situation may be determined. Whether to release the bypass situation may be determined based on whether the vehicle deviates from a lane link set and a road link section belonging to the start point and the end point of the bypass path and whether the vehicle follows the existing global path. When the vehicle deviates from the end point of the bypass path and follows the existing global path, a transition from the bypass state 350 to the general driving state 330 may be made. When the vehicle deviates from the end point of the bypass path, but fails to enter the existing global path due to other objects, the bypass state 350 of performing bypass driving before entrance to the global path while consistently modifying the bypass path may be maintained.

When the vehicle does not deviate from the end point of the bypass path, but converges to the existing global path, a transition from the bypass state 350 to the general driving state 330 may be made during bypass in the next frame because an end point of a new bypass path is naturally determined to be a path that more rapidly converges to the existing global path and the detour distance is decreased, compared to the existing path.

Figure 6:
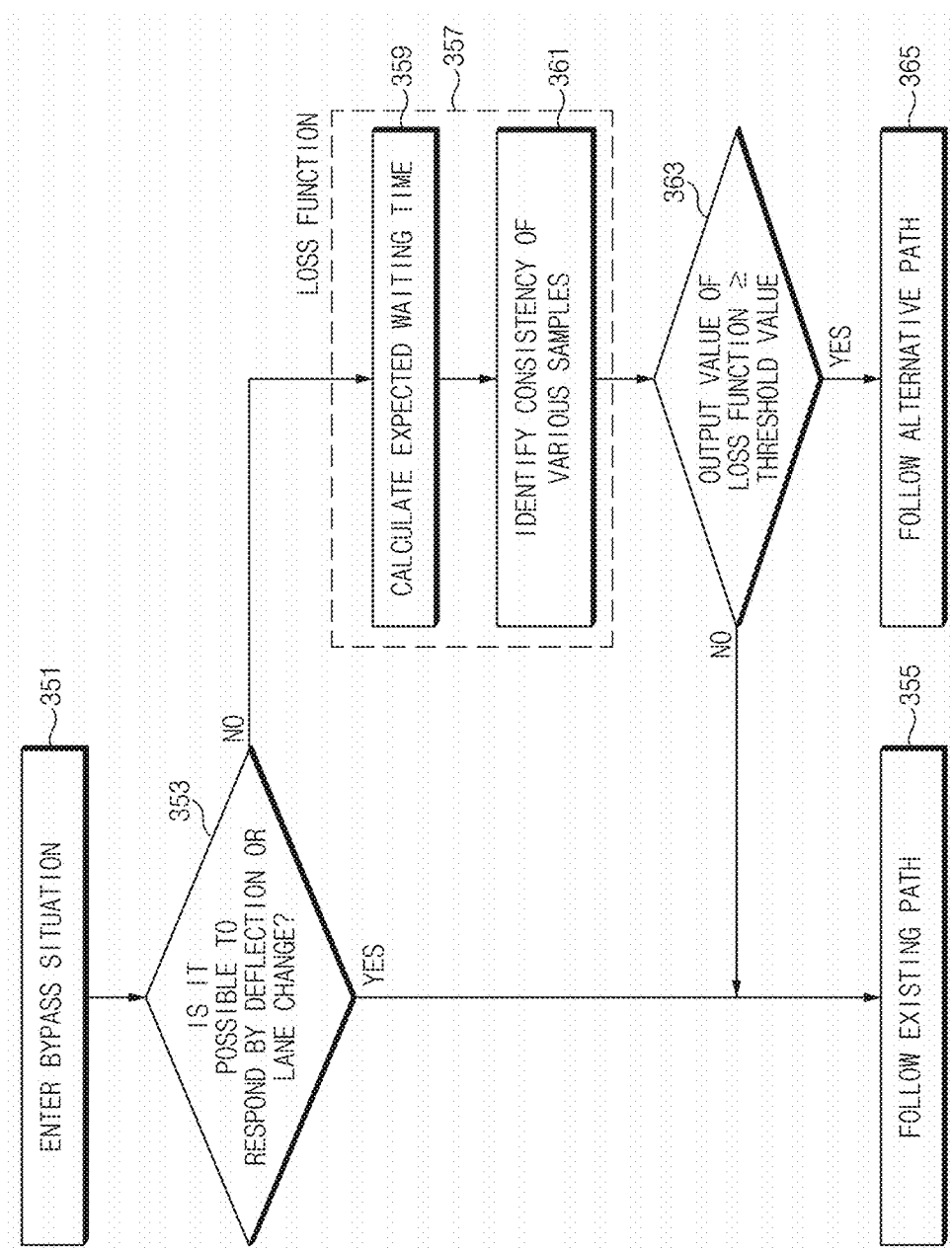
FIG. 6 is a flowchart illustrating a method of controlling a vehicle such that the vehicle travels along a bypass path according to an embodiment of the present disclosure.

FIG. 6 is a flowchart illustrating a method of controlling a vehicle such that the vehicle travels along a bypass path according to an embodiment of the present disclosure.

In operation 351, the vehicle control apparatus may enter a bypass situation. In operation 351, the vehicle control apparatus may set a real-time bypass path based driving system of an autonomous vehicle.

In operation 353, the vehicle control apparatus may determine whether it is possible to respond by deflection of the vehicle on a line or a lane change of the vehicle. In operation 353, the vehicle control apparatus may determine whether it is possible to respond to the situation by a method of deflecting the vehicle to one side on the line, changing the travel lane of the vehicle, or reducing the speed of the vehicle. When a traffic flow impediment target exists, the vehicle control apparatus may determine whether to perform waiting and speed reduction for the target or whether to calculate a bypass path and travel along an alternative path. The vehicle control apparatus may proceed to operation 355 when it is possible to respond (operation 353—YES). The vehicle control apparatus may proceed to operation 357 when it is impossible to respond (operation 353—NO).

In operation 355, the vehicle control apparatus may follow the existing path. The vehicle control apparatus may follow the existing path while responding to the situation by the method of deflecting the vehicle to one side on the line, changing the travel lane of the vehicle, or reducing the speed of the vehicle.

In operation 357, the vehicle control apparatus may calculate a loss function.

In detailed operation 359 included in operation 357, the vehicle control apparatus may calculate expected waiting time. The expected waiting time may be time to the next signal when the existing path is followed or at an intersection. When a traffic flow impediment target exists, the expected waiting time may be expected time until the traffic flow impediment target travels again.

In detailed operation 361 included in operation 357, the vehicle control apparatus may identify the consistency of various samples. When the vehicle control apparatus considers only the current situation for a traffic flow impediment target, a tendency of surrounding circumstances to change may not be reflected in the driving strategy of the vehicle control apparatus. For example, another vehicle that is waiting to make a U-turn may remain stopped and may travel again when the host vehicle yields to the other vehicle, or another vehicle that is trailing may travel again due to release of a front situation. Accordingly, when the corresponding situation between the various samples is not solved, travel to a bypass path may be determined. The vehicle control apparatus may determine the consistency between the various samples to increase the reliability for the determination result.

In operation 363, the vehicle control apparatus may determine whether an output value of the loss function is greater than a threshold value. When it is impossible to respond to the situation by deflection of the vehicle or a lane change, the vehicle control apparatus may calculate the loss function through waiting time for the existing path tracking and sampling. A loss value proportional to the expected waiting time may have a real value. When a plurality of samples are consistent with one another, a loss value having a magnitude proportional to a sampling value may be obtained. The weighted average of loss values may be an output value of the final loss function. Weighting values may be tuning parameters.

The vehicle control apparatus may proceed to operation 365 when the output value of the loss function is greater than the threshold value (operation 363—Yes). The vehicle control apparatus may proceed to operation 355 when the output value of the loss function is less than or equal to the threshold value (operation 363—No).

In operation 365, the vehicle control apparatus may follow an alternative path. The vehicle control apparatus may follow the alternative path when the output value of the loss function exceeds the threshold value. The vehicle control apparatus may bypass along the alternative path when the output value of the loss function is higher than the threshold value. When the output value of the loss function is higher than the threshold value, the vehicle control apparatus may follow the bypass path because a loss for the existing path is greater than that when the vehicle control apparatus follows the bypass path. When the output value of the loss function is less than or equal to the threshold value, the vehicle control apparatus may determine that it is more preferable to wait until the situation is resolved after coming to a stop while following the existing path.

Figure 7:
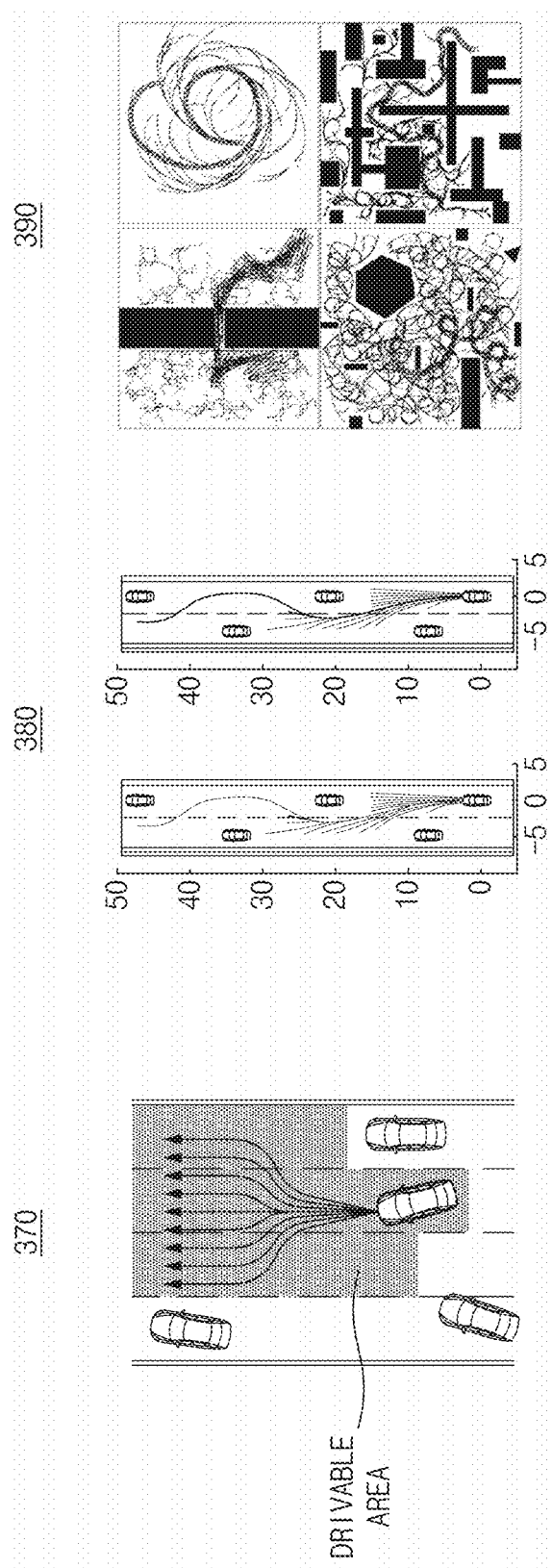
FIG. 7 is a view illustrating methods of generating a plurality of bypass paths according to an embodiment of the present disclosure.

FIG. 7 is a view illustrating methods of generating a plurality of bypass paths according to an embodiment of the present disclosure.

In situation 370, the vehicle control apparatus may generate a plurality of paths in a drivable area. The vehicle control apparatus may output all drivable paths serving as bypass paths in the entire drivable area. The load of the vehicle control apparatus generating a travel path may be small, and the computational load required for verifying the situation compatibility of the corresponding paths may be large. For example, loads required for determining a risk level for each path and comparing a target path and a preceding vehicle path may be large.

In situation 380, the vehicle control apparatus may generate a plurality of paths based on an fRRT algorithm. In situation 390, the vehicle control apparatus may generate a plurality of paths based on an RRT algorithm. The vehicle control apparatus may use the RRT or fRRT method based on random probability to generate as many random paths as possible.

As the interval between the paths generated by the vehicle control apparatus is decreased, the number of paths generated may be increased. As the interval between the paths generated by the vehicle control apparatus is decreased, the amount of computation finally performed for path verification may be increased. The vehicle control apparatus may tune the number of generated paths depending on the computation performance of a system.

The multi-path generation method is not limited to the RRT or fRRT method, and other path generation algorithms may be used to generate a plurality of paths. For example, a method of generating a plurality of different paths by repeatedly performing a process of taking a path through control points on a grid may be used. In another example, a method of generating a plurality of paths while varying offset around a representative path may be used.

Figure 8:
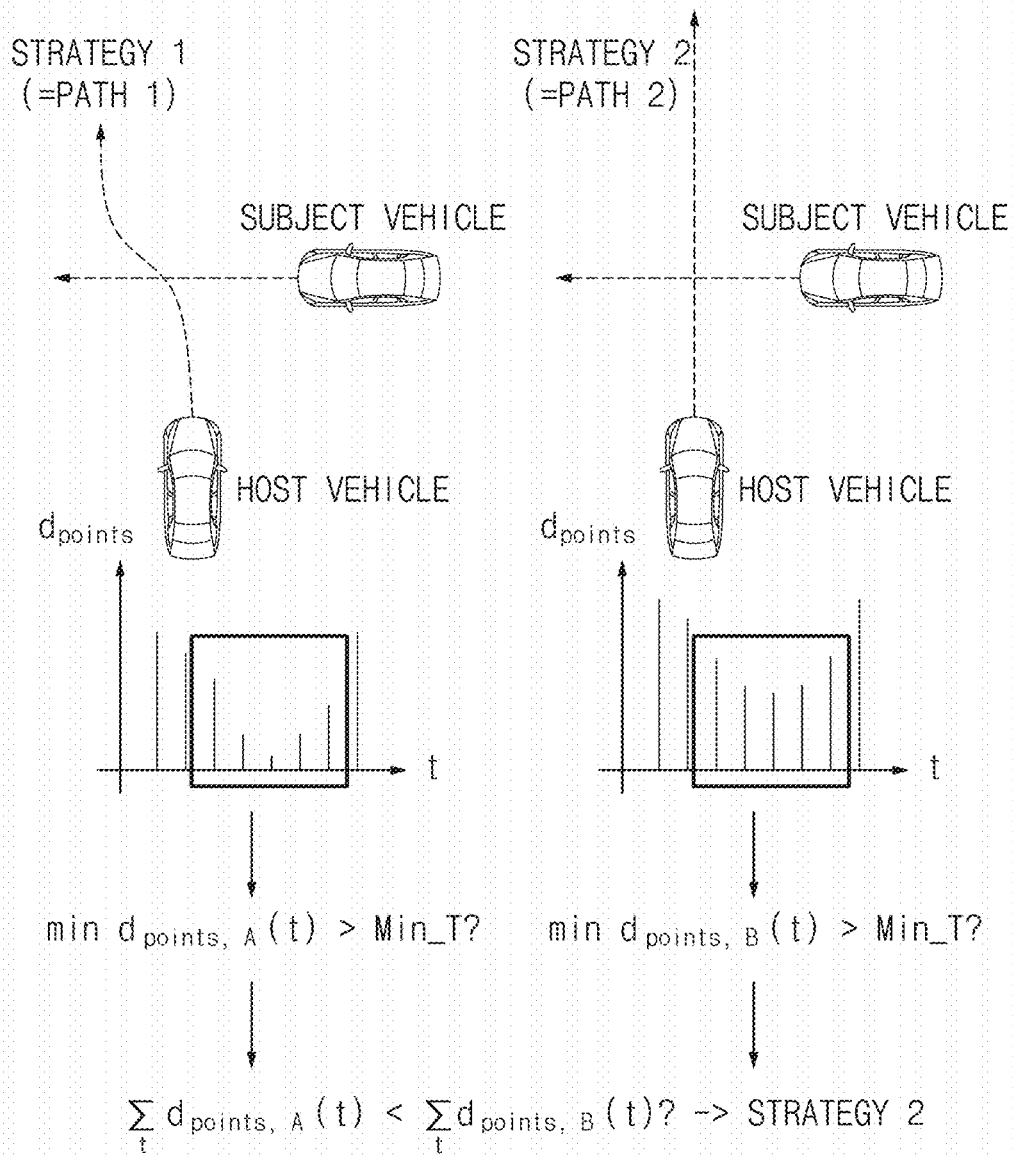
FIG. 8 is a view illustrating a method of determining a risk level in consideration of an expected path and collision time according to an embodiment of the present disclosure.

FIG. 8 is a view illustrating a method of determining a risk level in consideration of an expected path and collision time according to an embodiment of the present disclosure.

The vehicle control apparatus may calculate one bypass path by analyzing a plurality of paths. The most preferred path among the plurality of paths generated according to the method described with reference to FIG. 7 may be determined to be the one bypass path.

Referring to FIG. 8, when the preference criterion for determining the one bypass path is set to safety of the host vehicle during travel, among the paths along which the distance between the host vehicle and another vehicle is greater than or equal to a threshold value, a path along which the sum of the distances between the host vehicle and the other vehicle is maximum may be set to be the one bypass path. However, without being limited thereto, the preference criterion may be changed or complemented by another method of ensuring driving stability, riding quality, or smoothness of driving.

An expected path of the other vehicle and an expected path of the host vehicle calculated by the vehicle control apparatus may include location information of an object for each time. The vehicle control apparatus may calculate the expected relative distance $d_{points}(t)$ between the host vehicle and the other vehicle for each time by using the expected path of the other vehicle and the expected path of the host vehicle.

When the distance between the host vehicle and the other vehicle at arbitrary time t is shorter than a minimum threshold value Min_T, the vehicle control apparatus may determine that the distance between the host vehicle and the other vehicle is very short enough to cause actual collision. The minimum threshold value Min_T may be minimum time during which the host vehicle is able to respond to prevent collision. When the distance between the host vehicle and the other vehicle is shorter than the minimum threshold value Min_T, the corresponding path may cause a high risk, and therefore the vehicle control apparatus may exclude the corresponding path from candidate bypass paths.

When the interval between the host vehicle and the other vehicle for each time is consistently increased, the vehicle control apparatus may determine the path as a safe path. To determine whether the interval between the host vehicle and the other vehicle for each time is consistently increased, the vehicle control apparatus may select a situation in which the interval between the host vehicle and the other vehicle is determined to be longer, by using values having meaningful statistical significance, such as the sum of the distances between the host vehicle and the other vehicle for each time, the average of the distances between the host vehicle and the other vehicle, the minimum of the distances between the host vehicle and the other vehicle, or the median of the distances between the host vehicle and the other vehicle.

The vehicle control apparatus may determine more accurate collision possibility with an increase in the accuracy of the expected paths. The vehicle control apparatus may assign a risk judgment score in a form proportional to the sum of distances on a left-side path to paths satisfying basic safety requirements. The vehicle control apparatus may have a strategy to select a path having a high risk judgment score.

Figure 9:
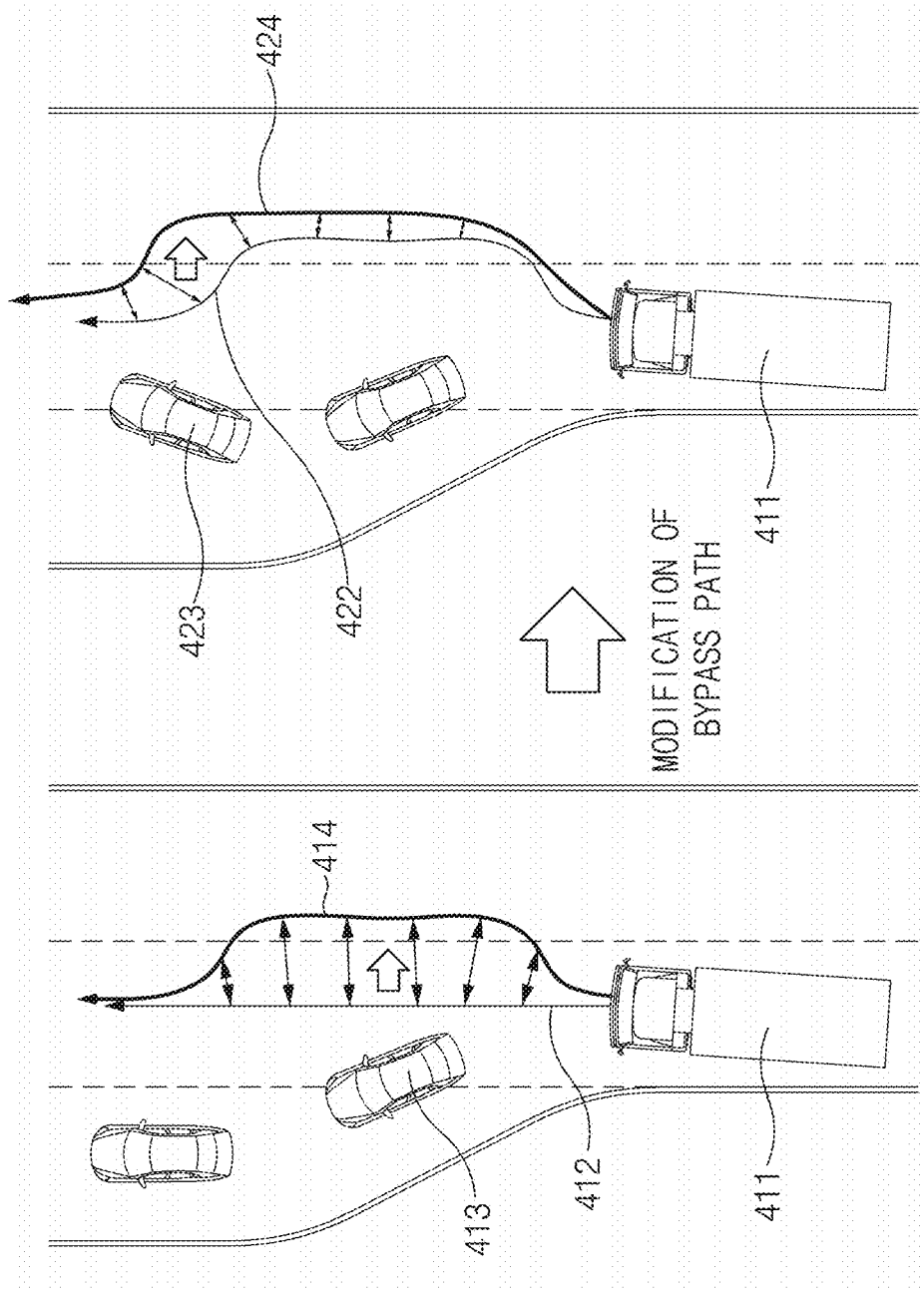
FIG. 9 is a view illustrating generation of a bypass path and modification of the bypass path according to an embodiment of the present disclosure.

FIG. 9 is a view illustrating generation of a bypass path and modification of the bypass path according to an embodiment of the present disclosure.

The vehicle control apparatus may generate a primary bypass path 414 when a reference path 412 of a vehicle 411 is impeded by another vehicle 413. When the reference path 412 is impeded by the other vehicle 413, the vehicle control apparatus may control the vehicle 411 such that the vehicle 411 travels along the primary bypass path 414. The vehicle control apparatus may set the first bypass path 414 to a new reference path 422.

The vehicle control apparatus may change the new reference path 422 of the vehicle 411 to modify the primary bypass path 414 of the vehicle 411. The vehicle control apparatus may generate a secondary bypass path 424 when the vehicle 421 is impeded by another vehicle 423 while travelling along the new reference path 422 corresponding to the primary bypass path 414. When the primary bypass path 414 is impeded by the other vehicle 423, the vehicle control apparatus may control the vehicle 411 such that the vehicle 411 travels along the secondary bypass path 424.

The vehicle 411 may move farther away from the existing path with an increase in the detour distance of the vehicle 411. As the detour distance of the vehicle 411 is increased, time during which the vehicle 411 stays in a bypass path driving state may be increased, and therefore the vehicle 411 may have a high possibility of encountering an unpredictable situation. As prediction uncertainty decreases, a driving strategy and response to the corresponding situation may be effective. Accordingly, the detour distance may preferably be short to reduce prediction uncertainty.

The vehicle control apparatus may generate a plurality of bypass paths. The vehicle control apparatus may calculate the shortest distance between the plurality of bypass paths and points on the reference paths 412 and 422. The vehicle control apparatus may configure a bypass distance score to have a higher score with a decrease in the distance between the plurality of bypass paths and the points on the reference paths 412 and 422. The vehicle control apparatus may output bypass distance scores for the plurality of paths.

Figure 10:
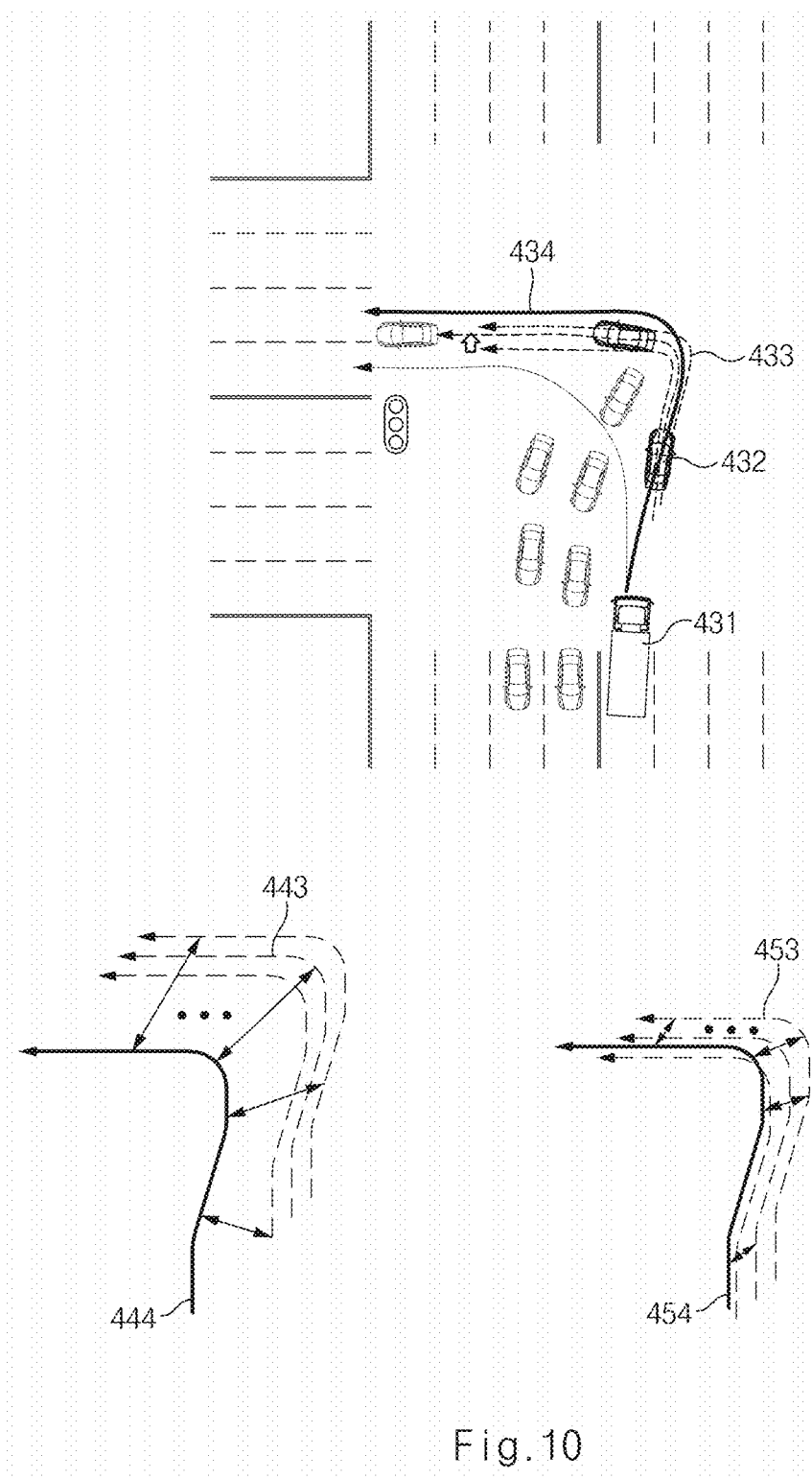
FIG. 10 is a view illustrating a method of comparing the similarity between trace sets of a plurality of bypass paths according to an embodiment of the present disclosure.

FIG. 10 is a view illustrating a method of comparing the similarity between trace sets of a plurality of bypass paths according to an embodiment of the present disclosure.

The vehicle control apparatus may set a bypass path 434 of a vehicle 431 using traces 433 of a plurality of preceding vehicles 432 ahead of the vehicle 431. The vehicle control apparatus may observe how the plurality of preceding vehicles 432 travelling along the same path as the vehicle 431 respond to a bypass situation and may make reference when determining the bypass path 434 of the vehicle 431.

The vehicle control apparatus may collect a plurality of traces 443 of the plurality of preceding vehicles 432 and may calculate a bypass path 444. The vehicle control apparatus may set a bypass path 454 such that the bypass path 454 is substantially the same as one trace 453 among the plurality of traces 443 of the plurality of preceding vehicles 432.

The vehicle control apparatus may calculate the bypass path 444 by tracking the plurality of preceding vehicles 432 during a plurality of frames and determining whether the plurality of preceding vehicles 432 consistently precede the vehicle 431. The vehicle control apparatus may determine whether the plurality of preceding vehicles 432 travel along the same path. When the plurality of preceding vehicles 432 consistently precede the vehicle 431 and travel along the same path, the vehicle control apparatus may store the traces of the plurality of preceding vehicles 432 during the plurality of frames.

The vehicle control apparatus may compare the similarity between the plurality of paths generated according to the method described above with reference to FIG. 7 and the traces of the plurality of preceding vehicles 432. The similarity comparison may be performed by calculating distances from points forming the plurality of traces to feet of vertical lines having the shortest distance to the plurality of paths.

The vehicle control apparatus may set a path having the highest similarity to the traces of the plurality of preceding vehicles 432 among the plurality of paths to a preferred bypass path. The vehicle control apparatus may allow a path having a higher similarity to have a higher preceding vehicle trace score. The vehicle control apparatus may output preceding vehicle trace scores for the plurality of paths and the traces of the plurality of preceding vehicles 432.

Figure 11:
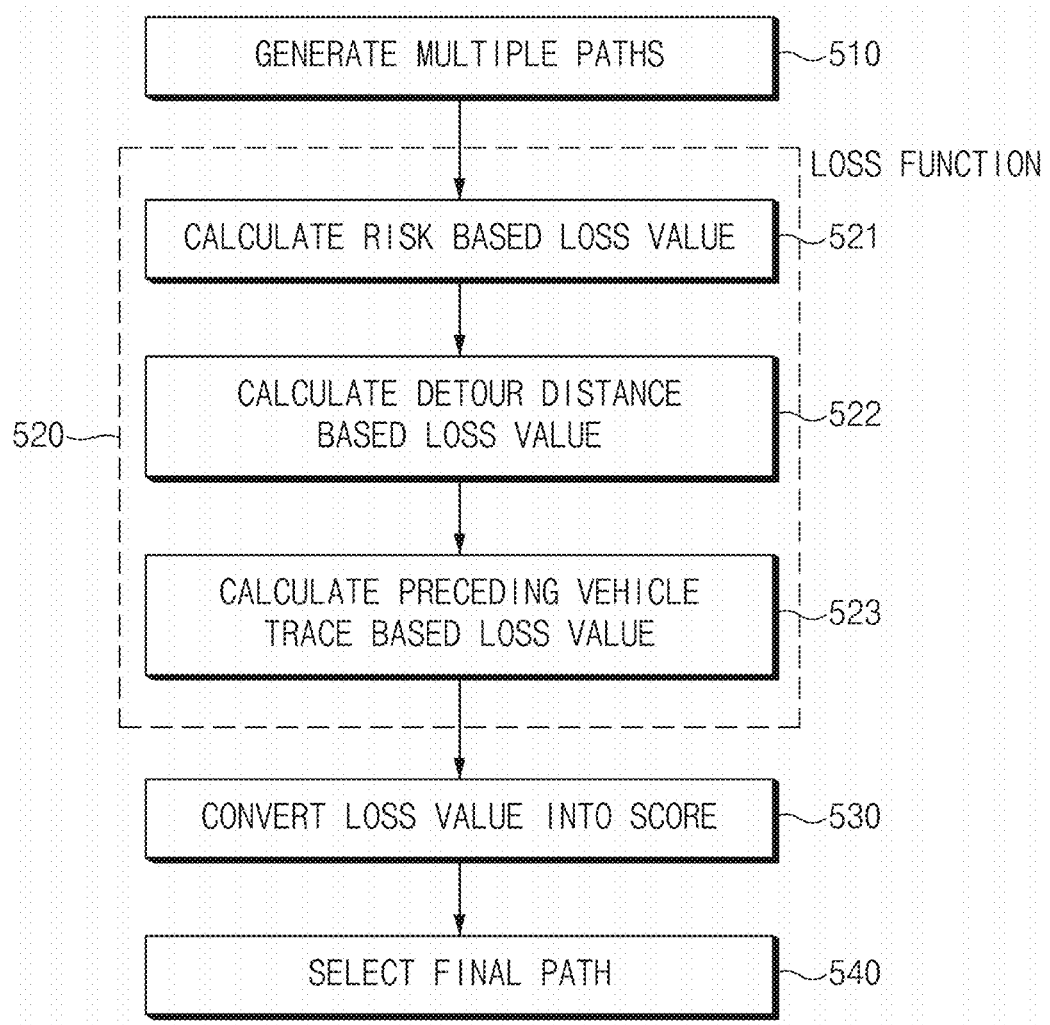
FIG. 11 is a flowchart illustrating a method of determining a final path among a plurality of bypass paths according to an embodiment of the present disclosure.

FIG. 11 is a flowchart illustrating a method of determining a final path among a plurality of bypass paths according to an embodiment of the present disclosure.

In operation 510, the vehicle control apparatus may generate multiple paths.

In operation 520, the vehicle control apparatus may generate a loss function. In detailed operation 521 included in operation 520, the vehicle control apparatus may calculate a risk based loss value. In detailed operation 522 included in operation 520, the vehicle control apparatus may calculate a detour distance based loss value. In detailed operation 523 included in operation 520, the vehicle control apparatus may calculate a preceding vehicle trace based loss value.

In operation 530, the vehicle control apparatus may convert the loss values into scores by using the loss function. In operation 540, the vehicle control apparatus may select the final path.

The vehicle control apparatus, when finally determining a bypass path, may consider the risk score, the detour distance score, and the preceding vehicle trace score calculated in operation 520. The vehicle control apparatus may configure the loss function such that a path having a high score is selected. For example, the vehicle control apparatus may select a path in which the sum of the three scores has a maximum value as the bypass path.

The vehicle control apparatus may provide priorities depending on the importance of factors considered when the loss values are converted into the scores. For example, a risk level may be important because it is directly connected with actual driving stability, a predictable response may be performed with a decrease in detour distance, and a preceding vehicle may not exist. The vehicle control apparatus may assign priorities in the sequence of a risk level, a detour distance, and a preceding vehicle trace.

The vehicle control apparatus may assign weighting values to the factors considered when the loss values are converted into the scores and may configure the loss function to add the scores in which the weighting values are reflected. For example, a risk level may have a weighting value of 5 because the risk level is directly connected with actual driving stability, a detour distance may have a weighting value of 3 because a predictable response is performed with a decrease in the detour distance, and a preceding vehicle may have a weighting value of 1.5 because the preceding vehicle does not exist in some cases. The vehicle control apparatus may multiply the risk score by a weighting value of 5, may multiply the detour distance score by a weighting value of 3, may multiply the preceding vehicle trace score by a weighting value of 1.5, and may calculate the sum of the scores in which the weighting values are reflected.

Figure 12:
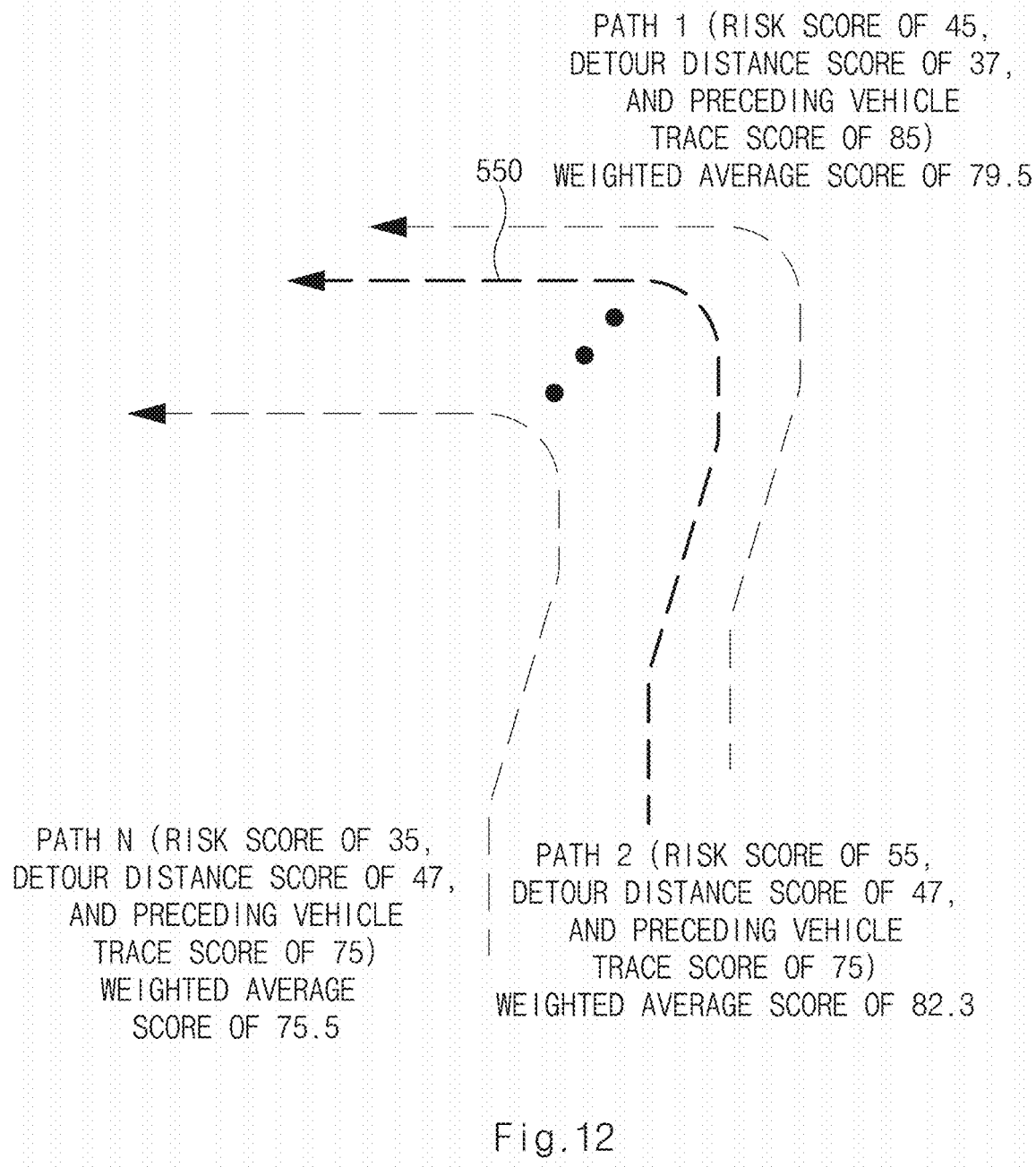
FIG. 12 is a view illustrating a method of determining a final path among a plurality of bypass paths according to an embodiment of the present disclosure.

FIG. 12 is a view illustrating a method of determining a final path among a plurality of bypass paths according to an embodiment of the present disclosure.

The vehicle control apparatus may calculate risk scores, detour distance scores, and preceding vehicle trace scores of a plurality of paths. The vehicle control apparatus may calculate the risk score of path 1 as 45, may calculate the detour distance score of path 1 as 37, and may calculate the preceding vehicle trace score of path 1 as 85. The vehicle control apparatus may calculate the risk score of path 2 as 55, may calculate the detour distance score of path 2 as 47, and may calculate the preceding vehicle trace score of path 2 as 75. The vehicle control apparatus may calculate the risk score of path N as 35 (N being a natural number of 3 or larger), may calculate the detour distance score of path N as 47, and may calculate the preceding vehicle trace score of path N as 75.

The vehicle control apparatus may assign weighting values to the risk scores, the detour distance scores, and the preceding vehicle trace scores of the plurality of paths and may calculate weighted average scores of the plurality of paths by using the scores to which the weighting values are assigned. The vehicle control apparatus may calculate the weighted average score of path 1 as 79.5. The vehicle control apparatus may calculate the weighted average score of path 2 as 82.3. The vehicle control apparatus may calculate the weighted average score of path N as 75.5.

The vehicle control apparatus may compare the weighted average scores of the plurality of paths and may select a path having the highest weighted average score as a bypass path 550. The vehicle control apparatus select path 2 having the highest weighted average score among path 1, path 2, and path N as the bypass path 550.

Figure 13:
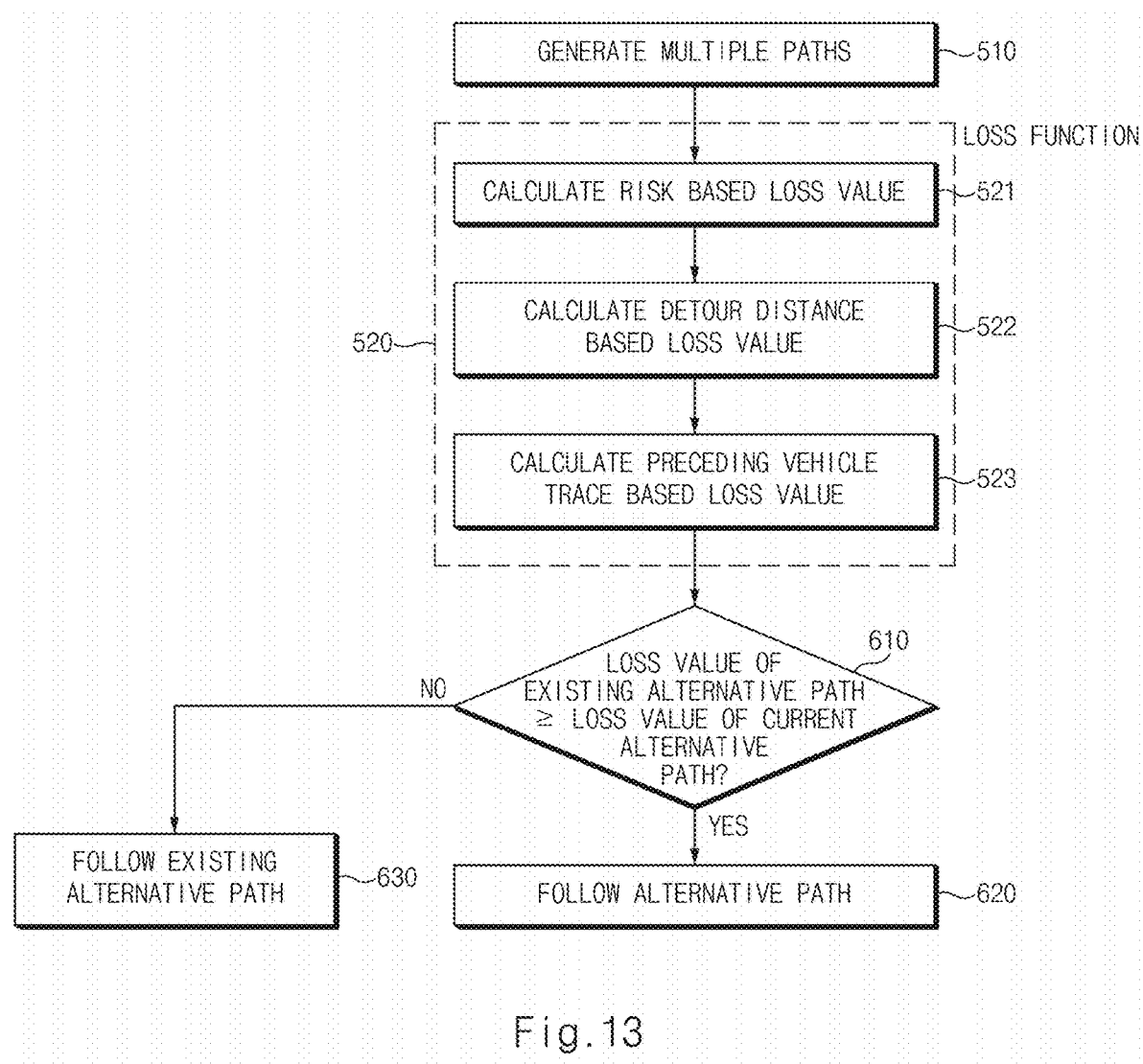
FIG. 13 is a flowchart illustrating a method of evaluating a bypass path according to an embodiment of the present disclosure.

FIG. 13 is a flowchart illustrating a method of evaluating a bypass path according to an embodiment of the present disclosure.

In operation 510, the vehicle control apparatus may generate multiple paths.

In operation 520, the vehicle control apparatus may generate a loss function.

In detailed operation 521 included in operation 520, the vehicle control apparatus may calculate a risk based loss value.

In detailed operation 522 included in operation 520, the vehicle control apparatus may calculate a detour distance based loss value.

In detailed operation 523 included in operation 520, the vehicle control apparatus may calculate a preceding vehicle trace based loss value.

In operation 610, the vehicle control apparatus may determine whether a loss value of an existing alternative path is greater than a loss value of a newly generated alterative path. The vehicle control apparatus may compare the loss value of the existing alternative path and the loss value of the newly generated alternative path when evaluating a bypass path in the same way as when evaluating a final bypass path. The vehicle control apparatus may compare a score of the existing alternative path and a score of the newly generated alternative path. The vehicle control apparatus may proceed to operation 620 when the loss value of the existing alternative path is greater than the loss value of the newly generated alterative path (operation 610—Yes). The vehicle control apparatus may proceed to operation 630 when the loss value of the existing alternative path is less than or equal to the loss value of the newly generated alterative path (operation 610—No).

In operation 620, the vehicle control apparatus may follow the newly generated alternative path. When the loss value of the existing alternative path is greater than the loss value of the newly generated alterative path, the vehicle control apparatus may determine that a detour to the existing bypass path is impossible due to a change in surroundings. When the loss value of the existing alternative path is greater than the loss value of the newly generated alterative path, the vehicle control apparatus may modify the bypass path to the newly generated alternative path.

In operation 630, the vehicle control apparatus may follow the existing alternative path.

When the vehicle control apparatus first generates a bypass path, an integrated lane may be a reference lane. The vehicle control apparatus may calculate a detour distance from the reference lane. The vehicle control apparatus may set the existing bypass path to the reference lane after evaluating the bypass path. The vehicle control apparatus may calculate a new bypass path by calculating the detour distance based on the existing bypass path. The vehicle control apparatus may evaluate a bypass path calculated such that a better path is selected in real time.

Figure 14:
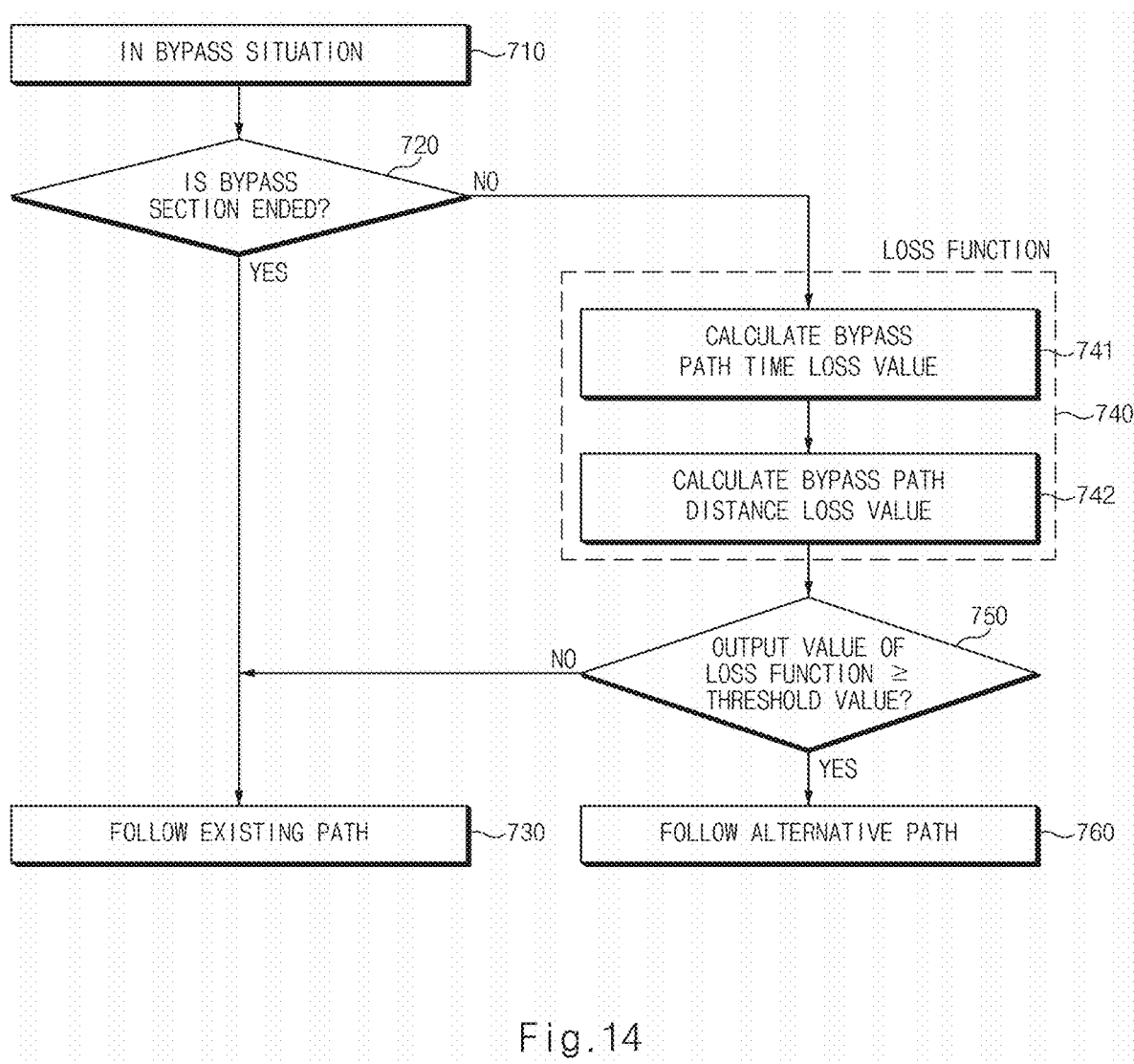
FIG. 14 is a flowchart illustrating a determination method of releasing a bypass situation according to an embodiment of the present disclosure.

FIG. 14 is a flowchart illustrating a determination method of releasing a bypass situation according to an embodiment of the present disclosure.

In operation 710, the vehicle control apparatus may control a vehicle in a bypass situation. The bypass situation may be maintained while the vehicle is in a bypass section. The bypass section may be a set of lane links including the start point and the end point of a bypass path of the vehicle and a set of road links belonging to the corresponding lane links.

In operation 720, the vehicle control apparatus may determine whether the bypass situation of the vehicle is ended. The vehicle control apparatus may determine whether to drive the vehicle on the current lane without maintaining detour any more due to ending of the bypass section or a change in surrounding circumstances.

The vehicle control apparatus may determine whether to end the bypass section, depending on whether the vehicle deviates from the lane link set and the road link section belonging to the start point and the end point of the bypass path and whether the vehicle follows the existing global path. The vehicle control apparatus may proceed to operation 730 when the bypass situation of the vehicle is ended (operation 720—Yes). The vehicle control apparatus may proceed to operation 740 while the bypass situation of the vehicle is maintained (operation 720—No).

In operation 730, the vehicle control apparatus may follow the existing path. The vehicle control apparatus may transition to a general driving state when the vehicle deviates from the end point of the bypass path and follows the existing global path.

In operation 740, the vehicle control apparatus may calculate a loss function. In sub-operation 741 included in operation 740, the vehicle control apparatus may calculate a bypass path time loss value. In sub-operation 742 included in operation 740, the vehicle control apparatus may calculate a bypass path distance loss value. The vehicle control apparatus may calculate a time loss value and a distance loss value for the case of maintaining a target lane and the case of travelling on the current lane.

In the case where the vehicle cannot follow the global path to reach a destination when consistently travelling along the bypass path, the time loss value and the distance loss value may be extra time and extra distance caused by changing the global path. For example, the case where the vehicle has to enter the first lane for a U-turn immediately after making a left turn, but cannot enter the first lane due to other waiting vehicles on the first lane may correspond to the case where the vehicle cannot follow the global path to reach the destination.

When the vehicle can follow the global path, an alternative path or a bypass path may naturally converge to the global path because a path having a small loss value is selected in a bypass path evaluation step.

In operation 750, the vehicle control apparatus may determine whether an output value of the loss function is greater than a threshold value. The vehicle control apparatus may proceed to operation 760 when the output value of the loss function is greater than the threshold value (operation 750—Yes). The vehicle control apparatus may proceed to operation 730 when the output value of the loss function is less than or equal to the threshold value (operation 750—No).

In operation 760, the vehicle control apparatus may follow an alternative path. In the case where the vehicle deviates from the end point of a bypass path, but fails to enter the existing global path due to other objects, the vehicle control apparatus may maintain bypass driving until entering the global path while consistently modifying the bypass path.

Figure 15:
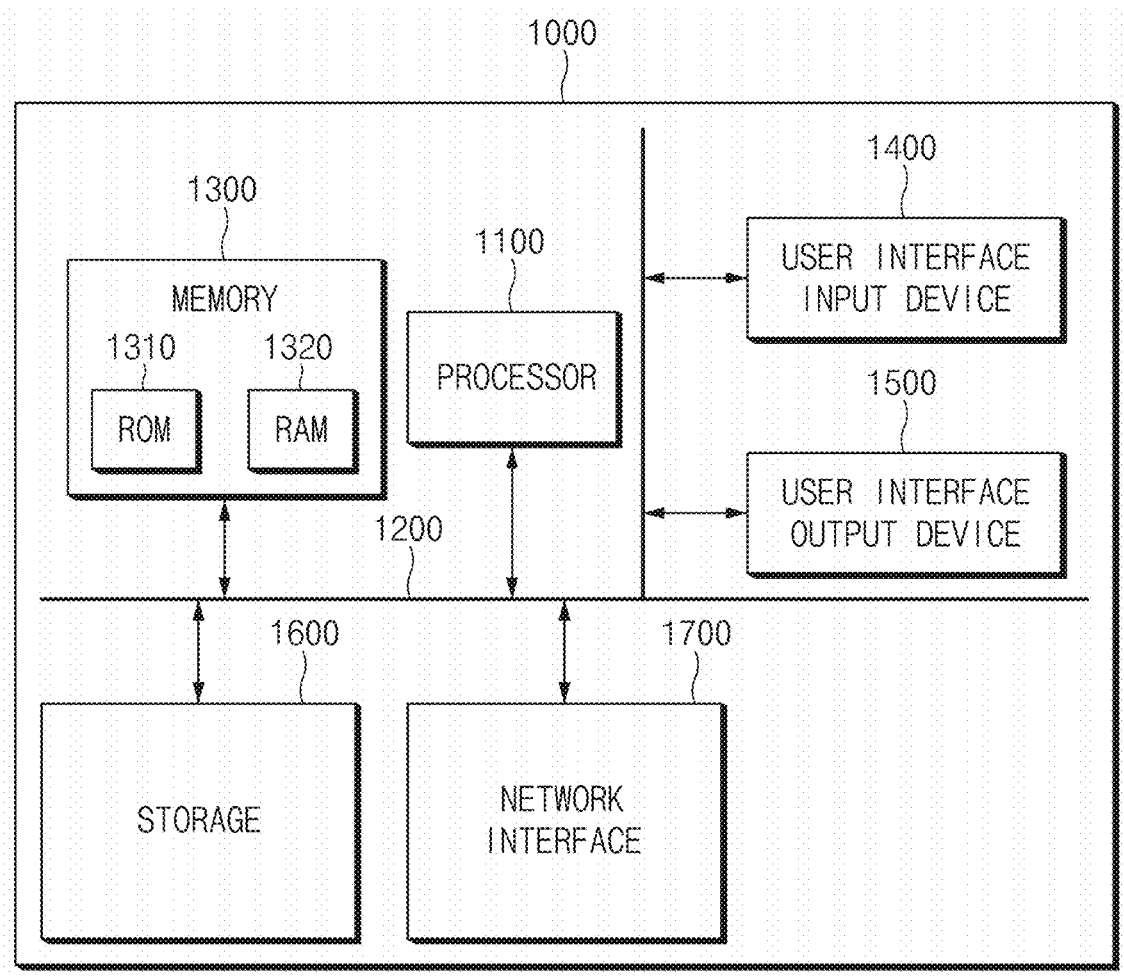
FIG. 15 illustrates a computing system according to an embodiment of the present disclosure.

FIG. 15 illustrates a computing system according to an embodiment of the present disclosure.

Referring to FIG. 10, the computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

In response to a situation in which a travel path of an autonomous vehicle is blocked, the present disclosure may replace the travel path with a bypass path and may allow the autonomous vehicle to travel along the bypass path. Accordingly, the present disclosure may control the autonomous vehicle to travel along the bypass path in various situations in which the autonomous vehicle needs to bypass during travel, thereby improving driving safety and stability.

Furthermore, the present disclosure may set a plurality of bypass paths and may select one of the plurality of bypass paths in real time, based on a risk level, a detour distance, and a trace of a preceding vehicle in a drivable area. Accordingly, the present disclosure may select a bypass path along which an autonomous vehicle safely and efficiently reaches a destination, thereby improving driving safety and efficiency.

In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

What is claimed is:

1. An apparatus for controlling a vehicle, the apparatus comprising:
   a memory; and
   a processor,
   wherein the processor is configured to:
      determine whether the vehicle is in a bypass situation in which the vehicle has to bypass;
      calculate a plurality of bypass paths of the vehicle to replace a previously set travel path in the bypass situation;
      evaluate the plurality of bypass paths of the vehicle;
      select a bypass path, among the plurality of bypass paths of the vehicle, based on an evaluation result of the plurality of bypass paths of the vehicle; and
      control the vehicle to travel along the selected bypass path, wherein the plurality of bypass paths of the vehicle is generated in a drivable area of the vehicle, and
   wherein the plurality of bypass paths is formed within one lane.

2. The apparatus of claim 1, wherein the processor is further configured to determine whether the vehicle is in the bypass situation based on a traffic flow impediment target and ambient information included in integrated object information.

3. The apparatus of claim 1, wherein the processor is further configured to determine whether the vehicle is in the bypass situation based on a presence of a target impeding a traffic flow on the travel path of the vehicle and a possibility to respond to the target by deflection on a line or a lane change.

4. The apparatus of claim 1, wherein the processor is further configured to determine, as the bypass situation, a situation where the travel path is blocked by another vehicle parked or stopped on a shoulder, another vehicle trailing at an intersection, or another vehicle stopping across a line while making a lane change.

5. The apparatus of claim 1, wherein when a traffic flow impediment target exists, the processor is further configured to determine whether to perform waiting and speed reduction for a target or whether to calculate the plurality of bypass paths and travel along an alternative path.

6. The apparatus of claim 1, wherein when it is impossible to respond to the bypass situation by deflection of the vehicle on a line or a lane change of the vehicle in the bypass situation, the processor is further configured to calculate a loss function through waiting time for existing path tracking and sampling, and when an output value of the loss function is greater than a threshold value, the vehicle follows an alternative path.

7. The apparatus of claim 6, wherein the processor is further configured to calculate expected waiting time for calculating the loss function, and
   wherein when an existing path is followed or at an intersection, the expected waiting time is a time period to a next signal, and
   wherein when a traffic flow impediment target exists, the expected waiting time is an expected time period until the traffic flow impediment target travels again.

8. The apparatus of claim 1, wherein when a preference criterion for selecting the bypass path among the plurality of bypass paths is set to include safety of the vehicle during travel, the processor is configure to select, among the plurality of bypass paths, bypass paths along which a distance between the vehicle and another vehicle is greater than or equal to a threshold value, and determine a final bypass path, among the selected bypass paths, along which a sum of distances between the vehicle and the another vehicle is maximum.

9. The apparatus of claim 1, wherein the processor is further configured to:
   calculate an expected path of another vehicle and an expected path of the vehicle for each time and calculate an expected relative distance between the vehicle and the another vehicle for each time; and
   exclude a corresponding path from candidate bypass paths when the expected relative distance is shorter than a minimum threshold value at an arbitrary time.

10. The apparatus of claim 1, wherein the processor is further configured to:
   generate a first bypass path and set the first bypass path as a new reference path when a reference path of the vehicle is impeded by another vehicle; and
   generate a modified bypass path when the vehicle is impeded by another vehicle while travelling along the new reference path corresponding to the first bypass path.

11. The apparatus of claim 1, wherein the processor is further configured to:
    collect a plurality of traces of a plurality preceding vehicles travelling ahead of the vehicle; and
    calculate the plurality of bypass paths by tracking the plurality of preceding vehicles during a plurality of frames and determining whether the plurality of preceding vehicles consistently precede the vehicle.

12. The apparatus of claim 1, wherein the processor is further configured to:
    calculate a risk based loss value, a detour distance based loss value, and a preceding vehicle trace based loss value while generating a loss function;
    convert a loss value into a score by using the loss function; and
    determine a final bypass path based on a risk score, a detour distance score, and a preceding vehicle trace score calculated while the loss function is generated.

13. The apparatus of claim 12, wherein the processor is further configured to:
    assign weighting values to the risk score, the detour distance score, and the preceding vehicle trace score of each of the plurality of bypass paths and calculate a weighted average score of each of the plurality of bypass paths by using the scores to which the weighting values are assigned; and
    compare the weighted average scores of the plurality of bypass paths and select a path having a highest weighted average score as the final bypass path.

14. The apparatus of claim 1, wherein the processor is further configured to:
    compare a loss value of an alternative path and a loss value of a newly generated alternative path in the evaluation; and
    modify the bypass path to the newly generated alternative path when the loss value of the existing alternative path is greater than the loss value of the newly generated alternative path.

15. The apparatus of claim 1, wherein the processor is further configured to determine whether to end a bypass section, based on whether the vehicle deviates from a lane link set and a road link section belonging to a start point and an end point of the bypass path and whether the vehicle follows an existing global path.

16. A method for controlling a vehicle, the method comprising:
    determining whether the vehicle is in a bypass situation in which the vehicle has to bypass;
    calculating a plurality of bypass paths of the vehicle to replace a previously set travel path in the bypass situation;
    evaluating the plurality of bypass paths of the vehicle;
    selecting one bypass path, among the plurality of bypass paths of the vehicle, based on an evaluation result of the plurality of bypass paths of the vehicle; and
    controlling the vehicle to travel along the selected bypass path, wherein the plurality of bypass paths of the vehicle is generated in a drivable area of the vehicle, and
    wherein the plurality of bypass paths is formed within one lane.

17. The method of claim 16, wherein the determining of whether the vehicle is in the bypass situation includes:
    determining whether the vehicle is in the bypass situation, based on a traffic flow impediment target and ambient information included in integrated object information.

18. The method of claim 16, wherein the determining of whether the vehicle is in the bypass situation includes:
    determining whether the vehicle is in the bypass situation, based on a presence of a target impeding a traffic flow on the travel path of the vehicle and a possibility to respond to the target by deflection on a line or a lane change.

19. The method of claim 16, wherein the determining of whether the vehicle is in the bypass situation includes:
    determining, as the bypass situation, a situation where the travel path is blocked by another vehicle parked or stopped on a shoulder, another vehicle trailing at an intersection, or another vehicle stopping across a line while making a lane change.

20. The method of claim 16, further comprising:
    determining whether to perform waiting and speed reduction for a traffic flow impediment target or whether to calculate the plurality of bypass paths and travel along an alternative path, when the traffic flow impediment target exists.

* * * * *